(12) United States Patent
Wheeler

(10) Patent No.: US 11,608,861 B2
(45) Date of Patent: Mar. 21, 2023

(54) CYLINDRICAL CONTACT POLYGON FOR TORQUE TRANSMISSION TO A DRIVESHAFT

(71) Applicant: Halliburton Energy Services, Inc., Houston, TX (US)

(72) Inventor: Fraser A. Wheeler, Alberta (CA)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 337 days.

(21) Appl. No.: 16/769,236

(22) PCT Filed: Feb. 22, 2018

(86) PCT No.: PCT/US2018/019149
§ 371 (c)(1),
(2) Date: Jun. 2, 2020

(87) PCT Pub. No.: WO2019/164490
PCT Pub. Date: Aug. 29, 2019

(65) Prior Publication Data
US 2021/0131497 A1   May 6, 2021

(51) Int. Cl.
*F16D 1/112* (2006.01)
*F16D 1/10* (2006.01)
*E21B 17/04* (2006.01)

(52) U.S. Cl.
CPC .............. *F16D 1/112* (2013.01); *E21B 17/04* (2013.01); *F16D 2001/102* (2013.01)

(58) Field of Classification Search
CPC . E21B 17/04; F16D 1/06; F16D 1/101; F16D 1/108; F16D 1/112; F16D 3/12;
(Continued)

(56) References Cited

U.S. PATENT DOCUMENTS 1,906,057 A * 4/1933 Guy .................... F16D 3/76
                                                     464/89
3,197,216 A * 7/1965 Jackson ................ F16D 3/06
                                                     464/75
(Continued)

FOREIGN PATENT DOCUMENTS

DE    102013105968 A1 * 12/2014 ............. F16D 1/101
JP    2009-257392 A    11/2009
(Continued)

OTHER PUBLICATIONS

International Search Report and Written Opinion dated Nov. 22, 2018; International PCT Application No. PCT/US2018/019149.

*Primary Examiner* — Josh Skroupa
(74) *Attorney, Agent, or Firm* — Barnes & Thornburg, LLP

(57) ABSTRACT

Transmitting torque from a housing to a drive shaft by configuring contact surfaces between a housing and shaft to increase the transmission of torque. Tools such as drilling tools often require torque to be transmitted from a rotating housing to a driveshaft. This is often accomplished through threaded connections or splines. A threaded connection can be used to transmit torque by allowing two pieces to be securely joined by rotating and tightening to a specified torque. A splined connection can also be used to transmit torque, providing sufficient clearance for one member to slidingly receive the other without rotating and torqueing. A tapered polygon may be used to transmit torque that by virtue of tapering can take up clearances between the torque carrying components. As such, the tapered polygon does not introduce significant stress concentrations into the components.

20 Claims, 3 Drawing Sheets

(58) Field of Classification Search
CPC ..... F16D 3/14; F16D 3/76; F16D 3/77; F16D 2001/062; F16D 2001/102; Y10T 403/3933; Y10T 403/7035; Y10T 403/7047; Y10T 403/7098
USPC .............................. 403/192, 359.6, 365, 383
See application file for complete search history.

(56) References Cited

U.S. PATENT DOCUMENTS

| | | | | |
|---|---|---|---|---|
| 3,593,933 | A * | 7/1971 | Grashorn | F16D 1/101 242/571.6 |
| 4,405,032 | A * | 9/1983 | Welschof | F16D 3/76 464/89 |
| 4,452,591 | A * | 6/1984 | Fishbaugh | F16D 3/76 464/89 |
| 5,201,679 | A * | 4/1993 | Velte, Jr. | B63H 23/34 440/49 |
| 5,716,279 | A * | 2/1998 | Ham | F16D 3/76 464/159 |
| 6,244,361 | B1 | 6/2001 | Comeau et al. | |
| 6,425,749 | B1 * | 7/2002 | Lettner | F16D 1/08 464/150 |
| 6,672,834 | B2 * | 1/2004 | Chen | F16D 9/06 416/204 R |
| 6,988,582 | B2 * | 1/2006 | Kitami | F16D 1/06 180/444 |
| 7,086,836 | B1 * | 8/2006 | Sheth | B63H 23/34 416/170 R |
| 7,488,225 | B2 * | 2/2009 | Lin | B63H 23/34 464/89 |
| 8,464,776 | B2 * | 6/2013 | Anthoine | F16D 1/101 464/75 |
| 9,863,191 | B1 | 1/2018 | Ide | |
| 2014/0353045 | A1 | 12/2014 | Zhang et al. | |
| 2017/0261038 | A1 | 9/2017 | Poyyara | |
| 2017/0266794 | A1 | 9/2017 | Hettich et al. | |

FOREIGN PATENT DOCUMENTS

| | | | | |
|---|---|---|---|---|
| WO | WO-2006002463 A1 * | 1/2006 | ............. | F16D 3/76 |
| WO | WO-2011153977 A1 * | 12/2011 | ............. | F16D 1/096 |

* cited by examiner

CYLINDRICAL CONTACT POLYGON FOR TORQUE TRANSMISSION TO A DRIVESHAFT

BACKGROUND

The disclosure generally relates to transmission of torque from a housing to a drive shaft. More specifically, the disclosure relates to configuration of contact surfaces between a housing and shaft to increase transmission of torque.

Tools such as drilling tools often require torque to be transmitted from a rotating housing to a driveshaft. This is often accomplished through threaded connections or splines. A threaded connection can be effective for transmitting torque by allowing two pieces to be securely joined by rotating and tightening to a specified torque. A splined connection can also be effective for transmitting torque, providing sufficient clearance for one member to slidingly receive the other without rotating and torqueing. A tapered polygon is another effective way to transmit torque that by virtue of tapering can take up clearances between the torque carrying components. As such, the tapered polygon does not introduce significant stress concentrations into the components.

BRIEF DESCRIPTION OF THE DRAWINGS

Illustrative embodiments of the present disclosure are described in detail below with reference to the attached drawing figures, which are incorporated by reference herein, and wherein.

Figure 1:
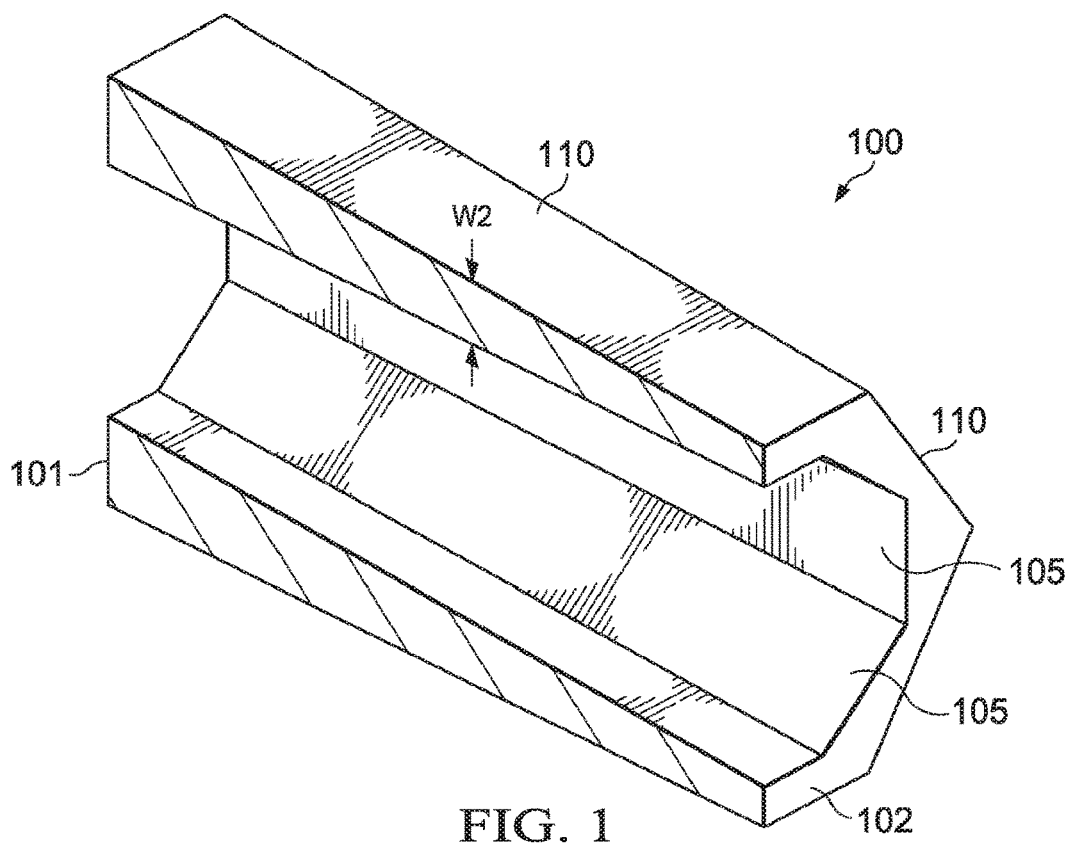
FIG. 1 is an example cut-away perspective of a flat contact polygon insert.

The illustrated figures are only exemplary and are not intended to assert or imply any limitation with regard to the environment, architecture, design, or process in which different embodiments may be implemented.

DETAILED DESCRIPTION

In the following detailed description of the illustrative embodiments, reference is made to the accompanying drawings that form a part hereof. These embodiments are described in sufficient detail to enable those skilled in the art to practice the disclosed subject matter, and it is understood that other embodiments may be utilized and that logical structural, mechanical, electrical, and chemical changes may be made without departing from the spirit or scope of the disclosure. To avoid detail not necessary to enable those skilled in the art to practice the embodiments described herein, the description may omit certain information known to those skilled in the art. The following detailed description is, therefore, not to be taken in a limiting sense, and the scope of the illustrative embodiments is defined only by the appended claims.

As used herein, the singular forms "a", "an," and "the" are intended to include the plural forms as well, unless the context clearly indicates otherwise. It will be further understood that the terms "comprise" and/or "comprising," when used in this specification and/or the claims, specify the presence of stated features, steps, operations, elements, and/or components, but do not preclude the presence or addition of one or more other features, steps, operations, elements, components, and/or groups thereof. In addition, the steps and components described in the embodiments and figures are merely illustrative and do not imply that any particular step or component is a requirement of a claimed embodiment.

The present disclosure includes an apparatus and method that, among other things, may reduce contact pressure at the torque transferring faces of a joint, and reduce the sensitivity to clearances. One example disclosed is related to a tapered cylindrical polygon insert that is configured with a plurality of curved faces around an inner circumference. The plurality of curved faces around an inner circumference of the tapered cylindrical polygon insert are configured to mate with matching curved faces of a drivable component such as a driveshaft. Moreover, the tapered cylindrical polygon insert is configured to be inserted into a rotatable housing that imparts the torque to the tapered cylindrical polygon insert, which in turn imparts torque to the drivable component.

The devices described herein may be suitable for use in the oil and gas industry, such as for use in well drilling and completion, or for powering tools downhole during operations. It will be appreciated, however, that the devices described herein are equally applicable to for use in other technical fields including, but not limited to, automotive, civil, marine, fabrication, water-jetting, aeronautics, manufacturing, medical fields and any other field where it may be desired to drive a shaft efficiently.

FIG. 1 is a cut-away perspective view of a tapered polygon insert 100 that is traditionally used as part of drilling tools to transmit torque from a rotating housing to a driveshaft. The tapered polygon insert 100 is configured with a plurality of outer flat surfaces 110 and a plurality of flat inner surfaces 105, or faces. The tapered polygon insert 100 tapers from a first end 101 to the second end 102 as denoted by width W2.

Figure 2:
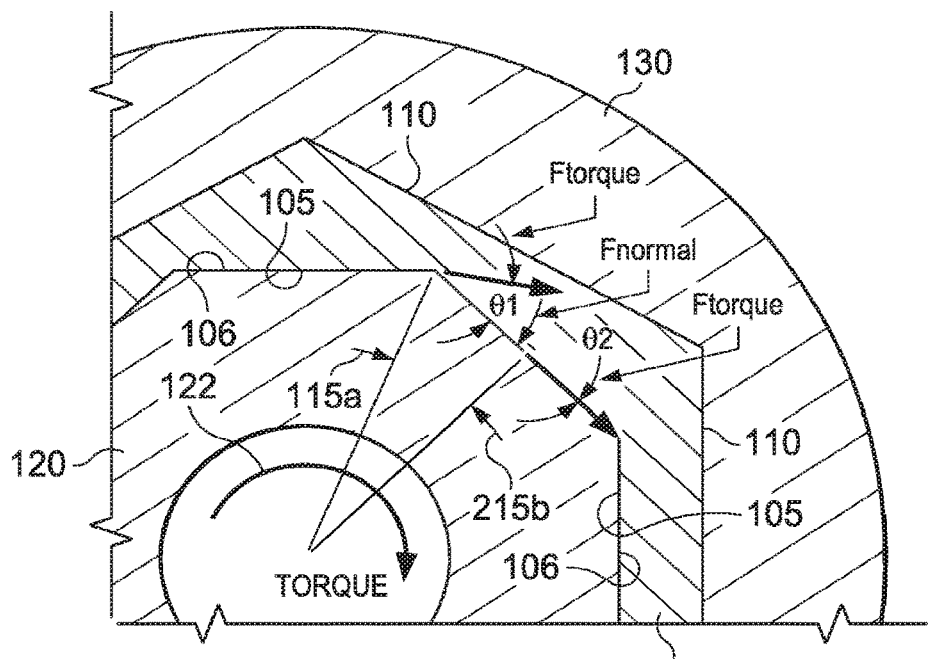
FIG. 2 is an example radial cross-sectional illustration of a flat contact polygon insert engaging a shaft to a rotatable housing.

FIG. 2 is a cross-sectional view of a drive shaft 120 inserted into the tapered polygon insert 100 which is inserted into a rotatable housing 130. The tapered polygon insert 100 is a preferred way to transmit torque since the taper form takes-up clearances between the torque carrying components and does not introduce significant stress concentrations into the components. The traditional implementation of the tapered polygon insert 100 involves a straight polygon profile having flat polygon inner surfaces 105, or faces, on a polygonal driveshaft having a plurality of surfaces 106 to mate with surfaces 105, and a tapered polygon profile on the mating housing. FIG. 2 illustrates that it is the normal force component, Fnormal, which transmits the torque from the tapered polygon insert 100 to the driveshaft 120. Only about half of the flat surface 105 provides an effective contact width, denoted between lines 115*a* and 115*b*, that is capable of transmitting the torque, Ftorque, through a normal force. Beyond this point, the faces 105 tend to separate. The angle Θ1 between the torque reaction force vector and the face is relatively shallow even at its maximum and reduces to zero Θ2, or tangent to the face, at about the midpoint of the face.

If clearances and tolerances are introduced and considered, the effective contact width reduces and angles become even shallower. This is an important consideration because it requires smaller portions of the faces 105, predominately at the edges, to carry the torque loads which significantly increases the contact pressure in localized areas.

Figure 3:
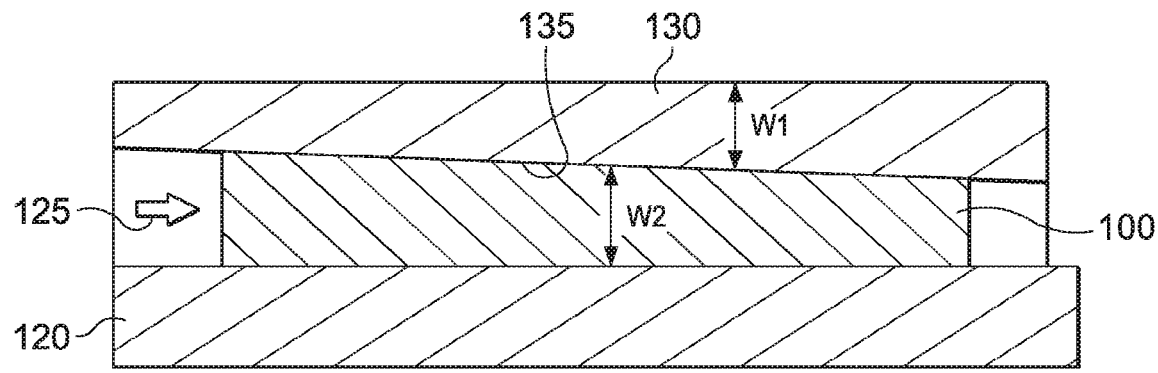
FIG. 3 is an example cross-section illustration of a flat contact polygon engaging a shaft to a rotatable housing, showing typical tapering.

FIG. 3 is an example illustration showing an axial cross-sectional view of a rotatable housing 130, a tapered polygon insert 100, and a driveshaft 120. The taper aspect of the housing is denoted by W1 and the taper aspect of the polygon insert 100 is denoted by W2. The tapered polygon insert 100 is typically forced 125 into the taper of a housing 130 in an attempt to reduce clearances 135. However, this becomes very sensitive to loosening. For example, the tapered polygon insert 100 can become loose downhole during well operations for several reasons including thermal expansion, vibration, stretching or compression of components from loads applied such as weight on bit or over pull. Since the polygonal feature of the driveshaft 120 has a smaller diameter than the inside polygonal features of the housing 130, the driveshaft 120 contact has higher contact pressure. Over time, the tapered polygon insert 100 may become damaged and require replacement.

Figure 4:
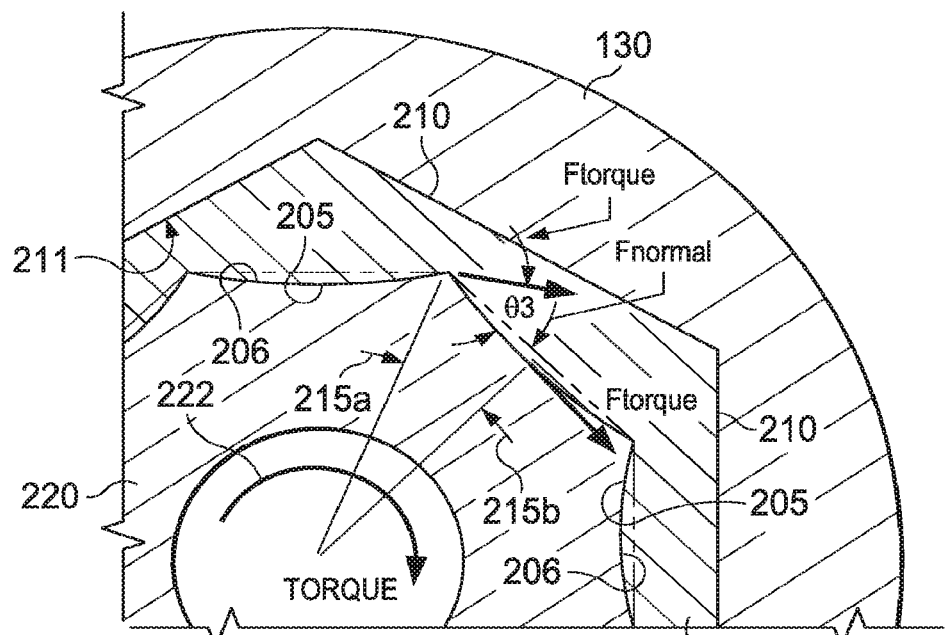
FIG. 4 is an example radial cross-sectional illustration of a cylindrical contact polygon insert engaging a mating shaft to a rotatable housing, configured according to principles of the disclosure.

FIG. 4 is a cross-sectional view of a drive shaft 220 inserted into the tapered cylindrical polygon insert 200, which is inserted into a rotatable housing 130, configured according to principles of the invention. The tapered cylindrical polygon insert 200 includes a polygon profile having curved inner surfaces 205, or curved faces about the inner circumference of the tapered cylindrical polygon insert 200. The area of each inner surface 205 may be of equal size. The polygonal driveshaft comprises a plurality of surfaces 206 to mate with surfaces 205. A tapered polygon profile on the mating housing 130 has flat polygonal surfaces 211 that mate with flat outer surfaces 210 of the tapered cylindrical polygon insert 200. The plurality of surfaces 206 of the driveshaft 220 each have a radius configured to mate with the corresponding curved surface 205 of the tapered cylindrical polygon insert 200. The curved inner surfaces 205 of the tapered cylindrical polygon insert 200 may each have a radius that extends across the width of each respective curved inner face. 205. Likewise, the plurality of surfaces 206 may each have a radius that extends across the width of each respective surface 206. In FIG. 4, the shape of curved inner surfaces 205 of the tapered cylindrical polygon insert 200 is convex, while the shape of each of the plurality of surfaces 206 of the driveshaft 220 is concave.

The tapered cylindrical polygon insert 200 comprising a drivable first component is similar to the tapered polygon insert 100 having flat surfaces of FIG. 1, however, the contact surfaces 205 of the tapered cylindrical polygon insert 200 are cylindrical or curved. The angle Θ3 between the torque reaction force vector and the tangent to the contact surface 205 is larger for the cylindrical contact surface 205 as compared with the flat surfaces 105 of the tapered polygon insert 100. The effective contact width, denoted as the width between 215a and 215b, is larger as compared with the tapered polygon insert 100, even with a small amount of curvature of surfaces 205. This results in a much larger normal force component at the contacting surfaces between the tapered cylindrical polygon insert 200 and driveshaft 220. The tapered cylindrical polygon insert 200 is more efficient at transferring the torque 222. Therefore, for equivalent loading, the tapered cylindrical polygon insert 200 will have lower contact pressure as compared with the tapered polygon insert 100 having flat surfaces. This has been confirmed through lab testing. The tapered cylindrical polygon insert 200 can tolerate more wear and less tight clearances before rounding off edges as compared with the tapered polygon insert 100 having flat surfaces. This permits the tapered cylindrical polygon insert 200 to function even if there is clearance or the retaining force needed for retaining the cylindrical polygon insert 200 within housing 130 is reduced down hole.

Figure 5:
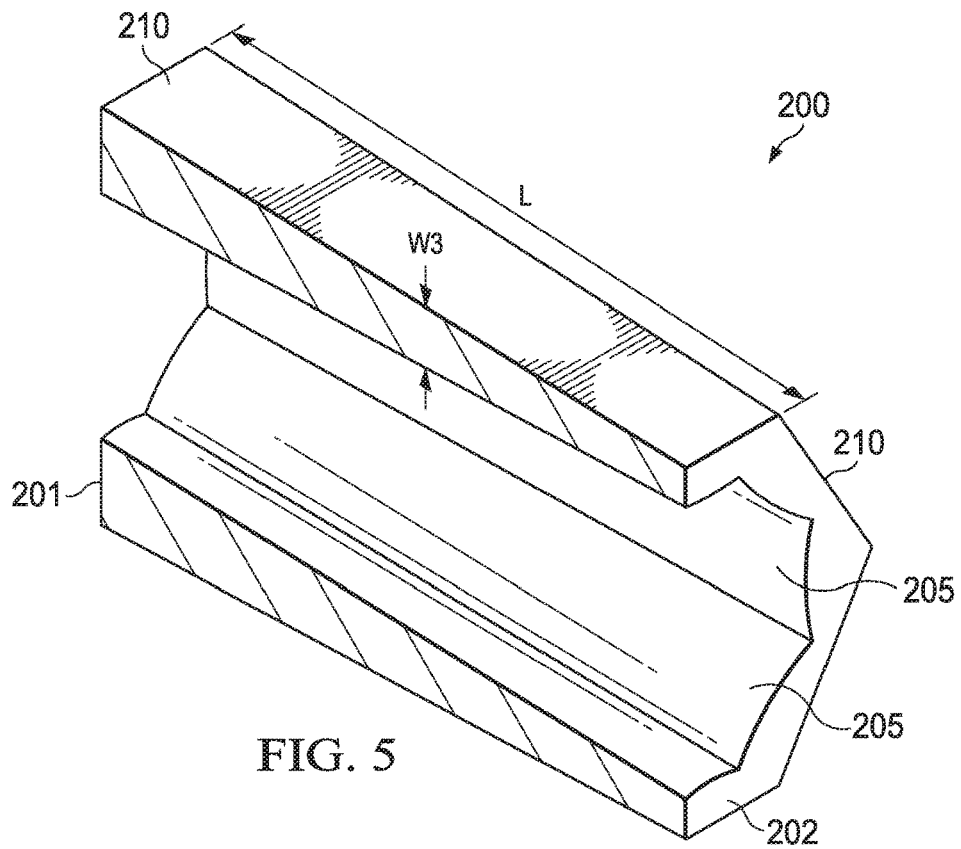
FIG. 5 is an example cut-away perspective of a cylindrical contact polygon insert, configured according to principles of the disclosure.

FIG. 5 is a cut-away perspective view of a tapered cylindrical polygon insert 200, configured according to principles of the invention. The tapered cylindrical polygon insert 200 is configured with a plurality of outer flat surfaces 210 about an outer circumference to form a closed polygon, and a plurality of curved inner surfaces 205, or faces, about an inner circumference forming an opening to engage and mate with a drivable first component such as driveshaft 220. The tapered cylindrical polygon insert 200 tapers from a first end 201 to the second end 202 as denoted by width W3. As such, an outer circumference at the first end 201 is greater than an outer circumference at the second end 202. The plurality of curved inner surfaces 205 are configured to mate with corresponding curved surfaces 206, such as surfaces of a driveshaft. The plurality of outer flat surfaces 210 are configured to mate with corresponding flat surfaces of a rotatable housing when the tapered cylindrical polygon insert 200 is inserted into a housing 130. The tapered cylindrical polygon insert 200 may be replaceable and a new tapered cylindrical polygon insert 200 may be inserted into the housing 130 as needed. The housing 130 may be part of a bottom hole tool assembly for use in drilling or well completion activity. The housing 130 comprises a rotatable second component that may be rotated by a drill string or similar downhole equipment.

Figure 6:
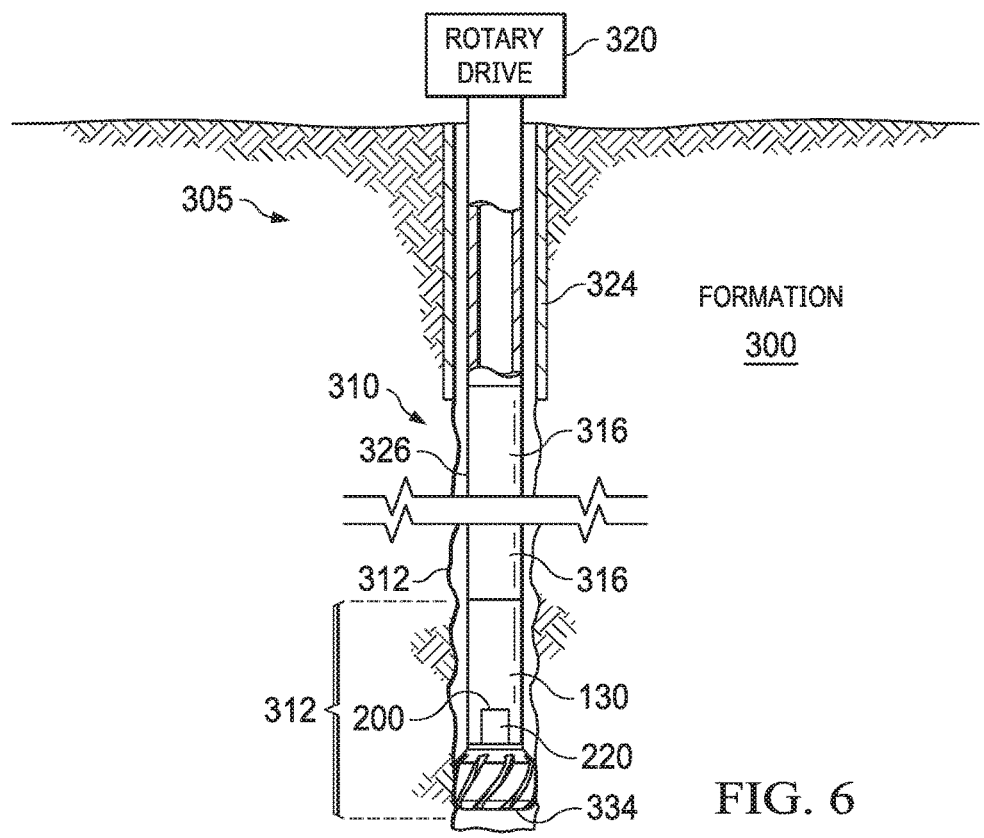
FIG. 6 is an example illustration of use of a cylindrical contact polygon insert and shaft in a well completion scenario, configured according to principles of the disclosure.

FIG. 6 is an illustration of an example drilling system 305, configured according to principles of the invention. The system 305 may include drill string 310 within casing 324. In this example, drill pipes 316, disposed within annular opening 326, connect with a rotary drive 320 at the surface for providing rotation down hole to tools, as well 317 is drilled in formation 300. The bottom hole assembly 312 may include a rotatable housing 130 with tapered cylindrical polygon insert 200 configured therein and a driveshaft 220 inserted into the tapered cylindrical polygon insert 200 for rotatably driving of a tool 334, such as a drill bit having driveshaft 220. The tool may comprise any down hole tool requiring rotation for well drilling or completion operations, such as, e.g., plug setting tools. Many other well system configurations are possible as a skilled artisan would know.

The tapered cylindrical polygon insert 200 is used to transmit torque between two components, and can greatly reduce costs for driveshafts because driveshafts are often scrapped or require significant repair due to damages or rounded off polygonal features.

Lab tests has shown that the tapered cylindrical polygon insert 200 is able to handle as much as 25,000 ft-lb (statically) for a 5200 size driveshaft and at that point the driveshaft or housing that drives the shaft began to twist. In effect, the tapered cylindrical polygon insert 200 is now stronger than the driveshaft.

The above-disclosed embodiments have been presented for purposes of illustration and to enable one of ordinary skill in the art to practice the disclosure, but the disclosure is not intended to be exhaustive or limited to the forms disclosed. Many insubstantial modifications and variations will be apparent to those of ordinary skill in the art without departing from the scope and spirit of the disclosure. The scope of the claims is intended to broadly cover the disclosed embodiments and any such modification. Further, the following clauses represent additional embodiments of the disclosure and should be considered within the scope of the disclosure:

Clause 1, an apparatus to transfer torque, comprising:
a replaceable polygonal shaped insert having a plurality of curved inner
faces about an inner circumference configured to mate with a drivable first component, and a plurality of faces about an outer circumference of the polygonal shaped insert configured to engage a rotatable second component that imparts torque to the polygonal shaped insert that transfers torque to the drivable first component.

Clause 2, the apparatus of clause 1, wherein the replaceable polygonal shaped insert is tapered from a first end to a second end.

Clause 3, the apparatus of clause 2, wherein an outer circumference about the first end is greater than an outer circumference about the second end.

Clause 4, the apparatus of any one of clause 1-3, wherein the rotatable second component comprises a rotatable housing.

Clause 5, the apparatus of any one of clause 1-4, wherein the drivable first component, the replaceable polygonal shaped insert and the rotatable second component comprise rotatable down hole devices.

Clause 6, the apparatus of any one of clause 1-5, wherein the plurality of curved inner faces includes a radius that extends across an entire extent of each inner face.

Clause 7, the apparatus of any one of clause 1-6, wherein each of the plurality of curved inner faces comprise a convex radius.

Clause 8, the apparatus of any one of clause 1-7, wherein the drivable first component comprises a plurality of surfaces about an outer circumference, each of the plurality of surfaces configured to engage and mate with a respective one of the plurality of curved inner faces of the replaceable polygonal shaped insert.

Clause 9, the apparatus of clause 8, wherein each of the plurality of surfaces comprise a radius.

Clause 10, the apparatus of clause 8, wherein each of the plurality of surfaces comprise a concave radius.

Clause 11, the apparatus of any one of clause 1-10, wherein each of the plurality of faces about an outer circumference of the polygonal shaped insert comprise flat faces.

Clause 12, the apparatus of any of clause 1-11, wherein the replaceable polygonal shaped insert, the drivable first component and the rotatable second component comprise a part of a bottom hole assembly.

Clause 13, an apparatus to transfer torque, comprising a replaceable polygonal shaped insert having a plurality of curved inner faces about an inner circumference and configured to engage and mate with a driveshaft, the polygonal shaped insert having a plurality of flat faces about an outer circumference configured to engage a rotatable housing that imparts torque to the polygonal shaped insert that transfers torque to the drivesahft.

Clause 14, the apparatus of clause 13, wherein the replaceable polygonal shaped insert is tapered about the outer circumference from a first end to a second end.

Clause 15, the apparatus of clauses 13 or 14, wherein the replaceable polygonal shaped insert, driveshaft and housing comprise part of a bottom hole assembly.

Clause 16, a method to transfer torque, comprising providing a replaceable polygonal shaped insert having a plurality of curved inner faces about an inner circumference configured to mate with respective faces of a drivable first component; inserting the drivable first component into the replaceable polygonal shaped insert; and inserting the replaceable polygonal shaped insert into a rotatable second component, the rotatable second component configured to be rotated imparting torque to the replaceable polygonal shaped insert that transfers the torques to the drivable first component.

Clause 17, the method of clause 16, wherein in the step of providing, the replaceable polygonal shaped insert is tapered from a first end to a second end about an outer circumference.

Clause 18, the method of clauses 16 or 17, wherein the rotatable second component comprises a rotatable housing and the drivable first component comprises a driveshaft.

Clause 19, the method of any one of clauses 16-18, wherein in the step of providing, each the plurality of curved inner faces includes providing a radius that extends across an entire extent of each inner face.

Clause 20, the method of any one of clauses 16-19, wherein the steps of providing and inserting together provide a bottom hole assembly.

While this specification provides specific details related to transmitting torque between two components, it may be appreciated that the list of components is illustrative only and is not intended to be exhaustive or limited to the forms disclosed. Other components related to transmitting torque will be apparent to those of ordinary skill in the art without departing from the scope and spirit of the disclosure. Further, the scope of the claims is intended to broadly cover the disclosed components and any such components that are apparent to those of ordinary skill in the art.

It should be apparent from the foregoing disclosure of illustrative embodiments that significant advantages have been provided. The illustrative embodiments are not limited solely to the descriptions and illustrations included herein and are instead capable of various changes and modifications without departing from the spirit of the disclosure.

What is claimed is:

1. An apparatus to transfer torque, comprising:
a replaceable polygonal shaped insert having a plurality of curved inner faces about an inner circumference configured to mate with a drivable first component;
the shape of each of the curved inner faces in the plurality consists of a convex curve; and
a plurality of faces about an outer circumference of the polygonal shaped insert configured to engage a rotatable second component that imparts torque to the polygonal shaped insert that transfers torque to the drivable first component.

2. The apparatus of claim 1, wherein the replaceable polygonal shaped insert is tapered from a first end to a second end.

3. The apparatus of claim 2, wherein an outer circumference about the first end is greater than an outer circumference about the second end.

4. The apparatus of claim 1, wherein the rotatable second component comprises a rotatable housing.

5. The apparatus of claim 1, wherein the drivable first component, the replaceable polygonal shaped insert and the rotatable second component comprise rotatable down hole devices.

6. The apparatus of claim 1, wherein the plurality of curved inner faces includes a radius that extends across an entire extent of each inner face.

7. The apparatus of claim 1, wherein each of the plurality of curved inner faces comprise a convex radius.

8. The apparatus of claim 1, wherein the drivable first component comprises a plurality of surfaces about an outer circumference, each of the plurality of surfaces configured to engage and mate with a respective one of the plurality of curved inner faces of the replaceable polygonal shaped insert.

9. The apparatus of claim 8, wherein each of the plurality of surfaces comprises a radius.

10. The apparatus of claim 8, wherein each of the plurality of surfaces comprises a concave radius.

11. The apparatus of claim 1, wherein the plurality of faces about an outer circumference of the polygonal shaped insert comprise flat faces.

12. The apparatus of claim 1, wherein the replaceable polygonal shaped insert, the drivable first component and the rotatable second component comprise a part of a bottom hole assembly.

13. An apparatus to transfer torque, comprising:
a replaceable polygonal shaped insert having a plurality of curved inner faces about an inner circumference and configured to engage and mate with a driveshaft;
the shape of each of the curved inner faces in the plurality consists of a convex curve;
the polygonal shaped insert having a plurality of flat faces about an outer circumference configured to engage a rotatable housing that imparts torque to the polygonal shaped insert that transfers torque to the driveshaft.

14. The apparatus of claim 13, wherein the replaceable polygonal shaped insert is tapered about the outer circumference from a first end to a second end.

15. The apparatus of claim 13, wherein the replaceable polygonal shaped insert, driveshaft and housing comprise part of a bottom hole assembly.

16. A method to transfer torque, comprising:
providing a replaceable polygonal shaped insert having a plurality of curved inner faces about an inner circumference configured to mate with respective faces of a drivable first component; wherein the shape of each of the curved inner faces in the plurality consists of a convex curve,
inserting the drivable first component into the replaceable polygonal shaped insert; and
inserting the replaceable polygonal shaped insert into a rotatable second component, the rotatable second component configured to be rotated imparting torque to the replaceable polygonal shaped insert that transfers the torques to the drivable first component.

17. The method of claim 16, wherein the replaceable polygonal shaped insert is tapered from a first end to a second end about an outer circumference.

18. The method of claim 16, wherein the rotatable second component comprises a rotatable housing and the drivable first component comprises a driveshaft.

19. The method of claim 16, wherein each of the curved inner faces in the plurality of curved inner faces includes a radius that extends across an entire extent of each inner face.

20. The method of claim 16, further comprising producing a bottom hole assembly.

* * * * *